United States Patent [19]
Emery

[11] Patent Number: 5,655,016
[45] Date of Patent: Aug. 5, 1997

[54] DISTINCTIVE TELEPHONE ANNUNCIATOR

[75] Inventor: Keith E. G. Emery, Poway, Calif.

[73] Assignee: Hewlett-Packard Company, Palo Alto, Calif.

[21] Appl. No.: 606,141

[22] Filed: Feb. 23, 1996

[51] Int. Cl.⁶ ............................................. H04M 1/00
[52] U.S. Cl. ........................ 379/374; 379/375; 379/373
[58] Field of Search ................................. 379/374, 375, 379/373, 376, 377, 442

[56] References Cited

U.S. PATENT DOCUMENTS

| | | | |
|---|---|---|---|
| 4,467,144 | 8/1984 | Wilkerson et al. | 379/217 |
| 4,847,895 | 7/1989 | Wen | 379/375 |
| 5,086,458 | 2/1992 | Bowen | 379/180 |
| 5,127,045 | 6/1992 | Cragun et al. | 379/442 |
| 5,142,569 | 8/1992 | Peters et al. | 379/201 |
| 5,323,451 | 6/1994 | Yatsunami | 379/100 |

Primary Examiner—Krista M. Zele
Assistant Examiner—Keith Ferguson

[57] ABSTRACT

An annunciator is connectable between a phone line terminal and a telephone. The annunciator includes a connector for connecting to a ring conductor in the terminal. A sense circuit is coupled to the connector and converts the ring signal to a control signal. The annunciator further includes a speaker and a memory for storing data indicative of a distinctive annunciation pattern. A processor is responsive to an input control signal from the sensor circuit to utilize the data from the memory to drive the speaker to output the distinctive annunciation pattern. The processor further includes an input for enabling a user to input the distinctive annunciation pattern so that the pattern can be stored for later access by the processor.

5 Claims, 3 Drawing Sheets

DISTINCTIVE TELEPHONE ANNUNCIATOR

FIELD OF THE INVENTION

This invention relates to the production of distinctive telephone ring signals and, more particularly, to a telephone annunciator which is user-programmable to produce a distinctive audible annunciation in response to an incoming ring signal.

BACKGROUND OF THE ART

The use of distinctive ring signals has long been known. For instance, when multi-party lines were in vogue, telephone central offices would place a distinctive ring signal on the multi-party telephone line to notify one of the parties that it was his/her telephone that was being signalled. Telephone central offices today offer a distinctive ring feature which enables multiple devices connected to a single telephone line to distinguish which of the devices is being accessed. For instance, if a telephone and a facsimile are connected to the same line, the facsimile can be programmed to respond to a particular ring cadence.

U.S. Pat. No. 5,086,458 to Bowen describes the provision of a plug-in, tone responsive unit at each telephone extension. A central answering unit responds to a caller-initiated, telephone company-generated ring signal and establishes a connection with the calling phone. Each remote unit responds to a different predetermined tone frequency. When the caller pushes a key on a touch-tone phone key pad, the responding remote unit generates a ring signal for that extension.

U.S. Pat. No. 5,142,569 to Peters et al. describes a device which prevents a subscriber receiver from receiving ring signals other than those having a prescribed ring cadence. U.S. Pat. No. 5,323,451 to Yatsunami describes a facsimile which is programmable to respond to a distinctive ring pattern from a central office.

When multiple telephones are present in an open work area, it is sometimes difficult to distinguish which telephone is ringing. Moreover, when plural telephones, ring at the same time, it can become even more difficult to determine which telephones are to be answered. While it is known that a private branch exchange (PBX) can provide distinctive ring signals to individual telephone extensions, many PBX facilities do not have such capability and those which do generally provide only a limited number of distinctive ring cadences, (e.g., one indicating that the call is from an internal extension, and another indicating that the call is from an outside line).

Accordingly, it is an object of this invention to provide a distinctive ring annunciator which is directly connectable to a telephone line outlet.

It is another object of this invention to provide a distinctive ring annunciator which is both directly connectable to a phone outlet and is programmable to enable a user to determine the precise ring or other annunciation that is to occur upon receipt of a telephone ring signal.

SUMMARY OF THE INVENTION

An annunciator is connectable between a phone line terminal and a telephone. The annunciator includes a connector for connecting to a ring conductor in the terminal. A sense circuit is coupled to the connector and converts the ring signal to a control signal. The annunciator further includes a speaker and a memory for storing data indicative of a distinctive annunciation pattern. A processor is responsive to an input control signal from the sensor circuit to utilize the data from the memory to drive the speaker to output the distinctive annunciation pattern. The processor further includes an input for enabling a user to input the distinctive annunciation pattern so that the pattern can be stored for later access by the processor.

DETAILED DESCRIPTION OF THE PREFERRED EMBODIMENT

Figure 1A:
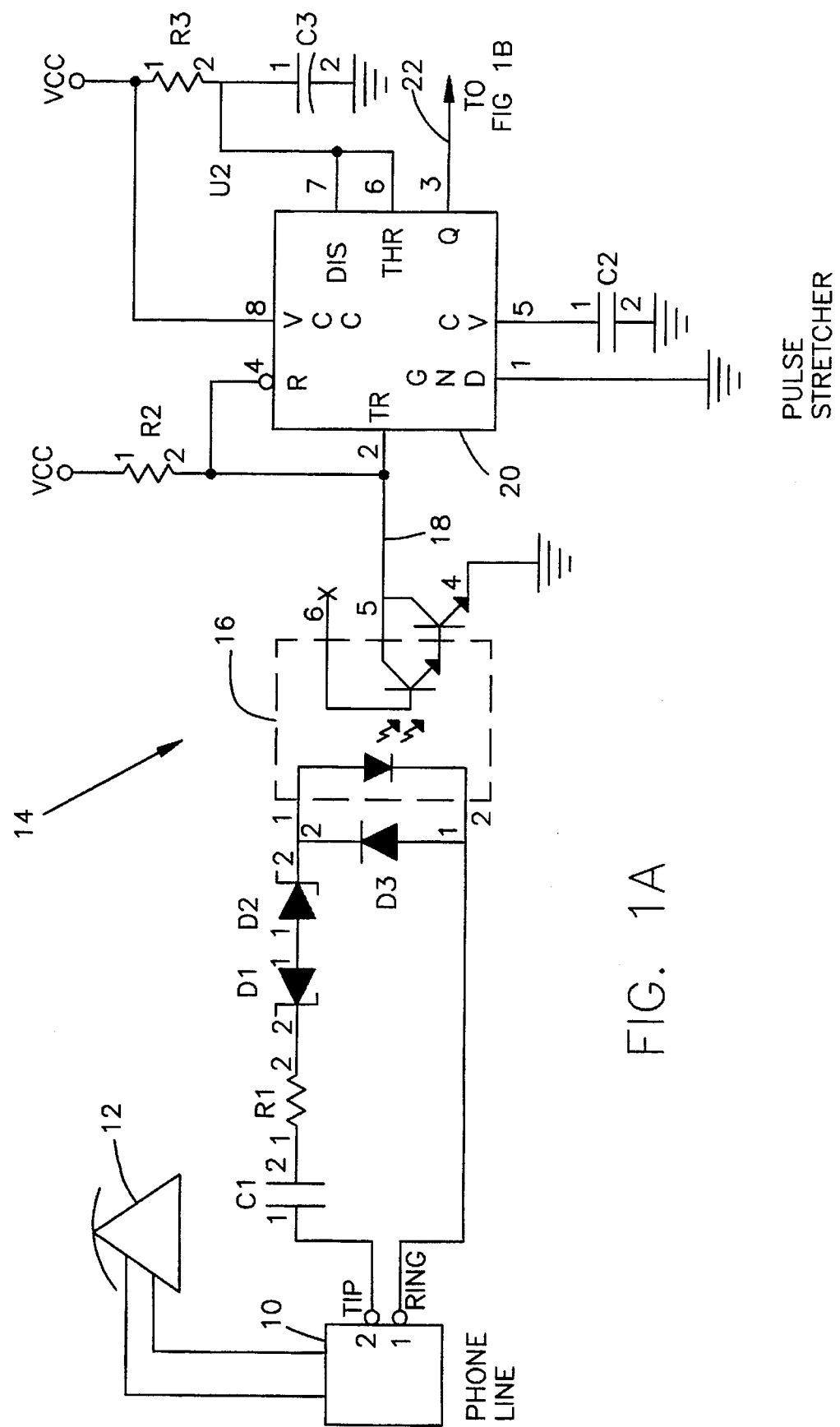
FIGS. 1A–1C illustrate is a circuit diagram illustrating the invention.
Figure 1B:
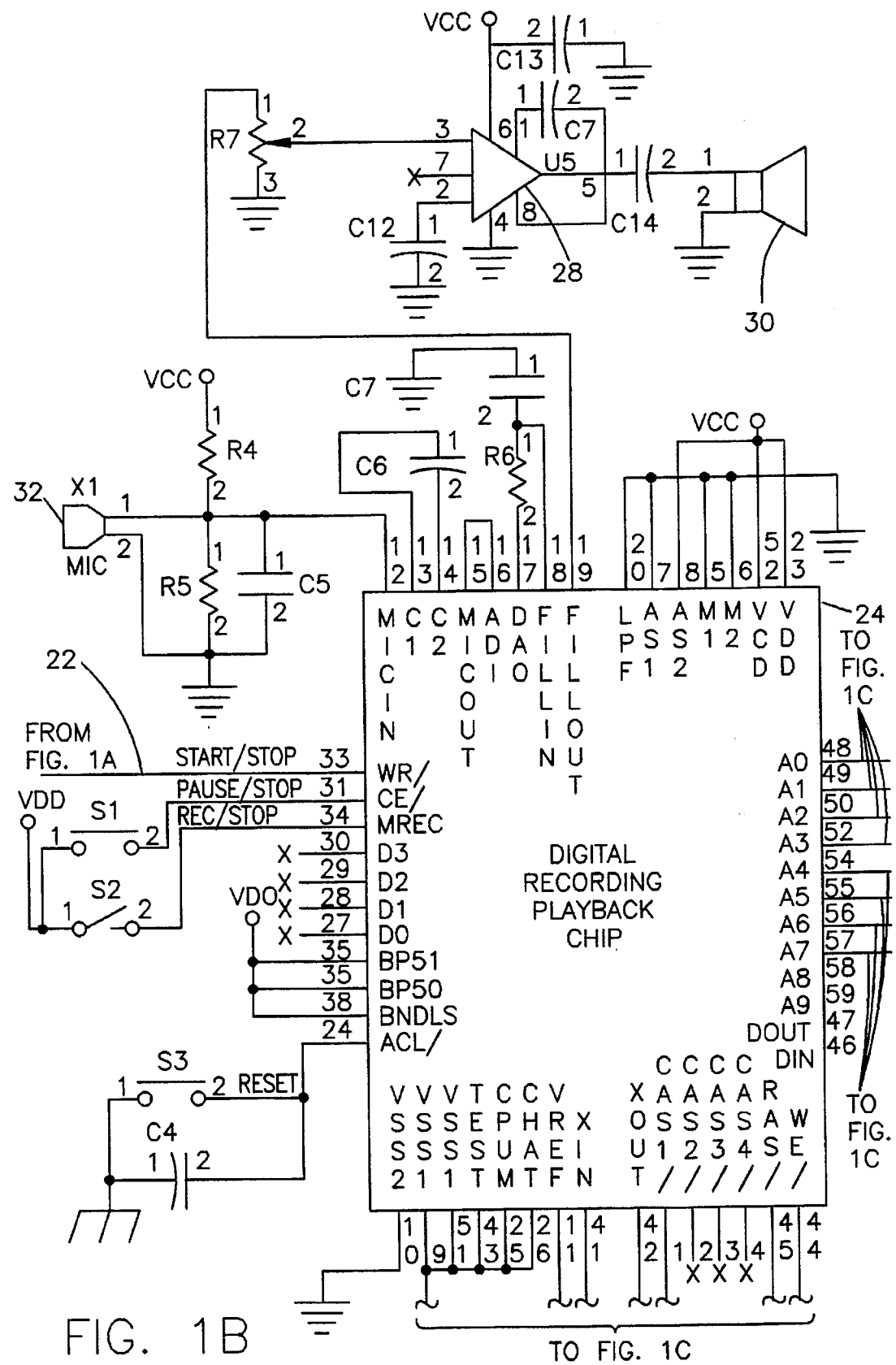
Figure 1C:
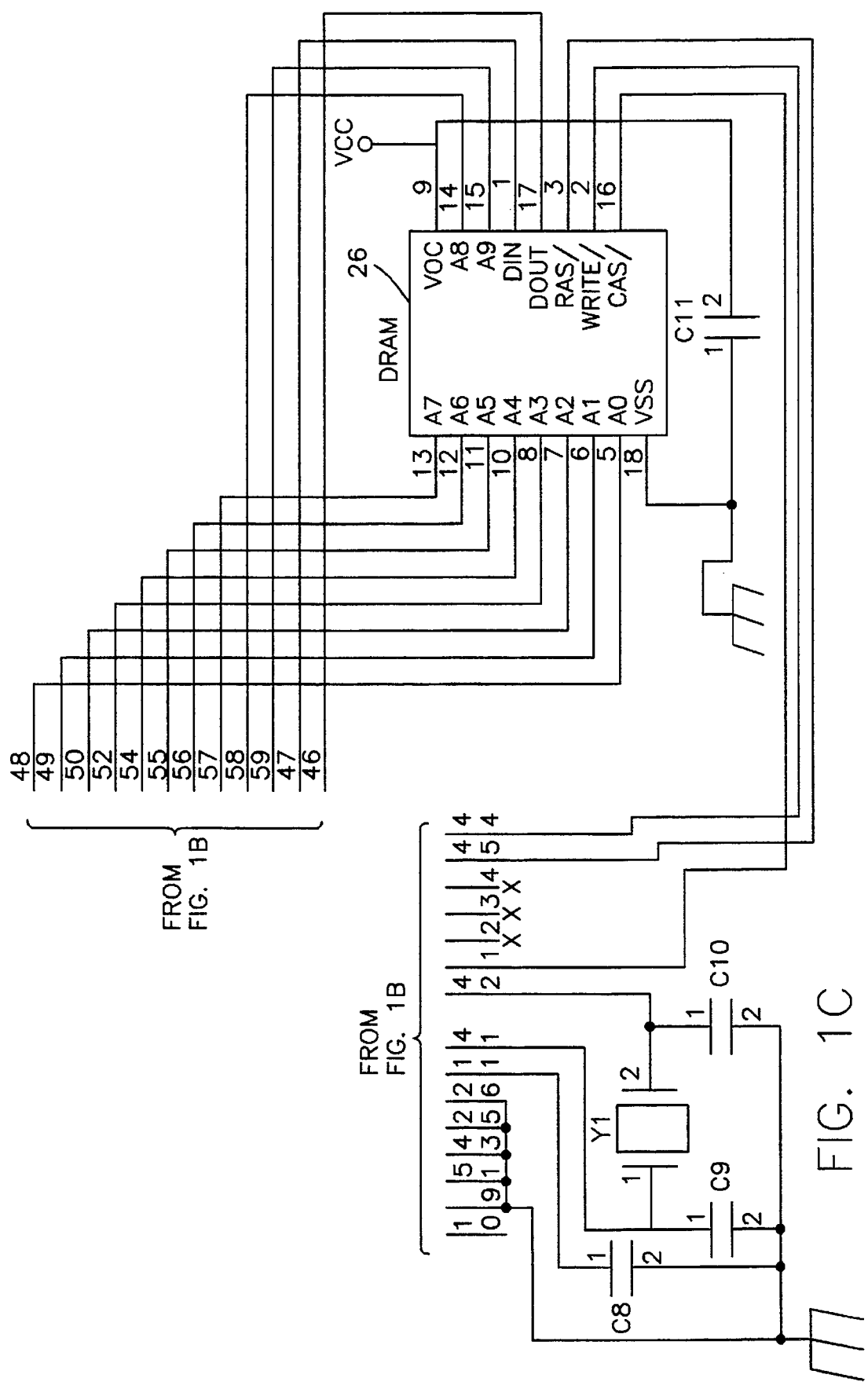

An incoming phone line is connected to a terminal 10, where a Y-connector (not shown) connects the ring line in parallel to both a telephone 12 and a ring annunciator 14. When ring annunciator 14 is connected to terminal 10, a user will normally disable or turn down the ring volume control on telephone 12. The ring signal, which is a 90 volt AC signal, is rectified by diode D3 and is clamped by a pair of oppositely polled Zener diodes D1 and D2.

The rectified, clamped, ring signal is then applied, via an optical coupler 16, to input line 18 of a pulse stretcher 20. Pulse stretcher 20 responds to the rectified, clamped ring signal to output a control potential on start/stop line 22. Because the received ring signal is generally poorly controlled, pulse stretcher 20 is used to assure that the duration of the signal on start/stop line 22 is sufficiently long to reliably initiate operation of a digital recording/playback (DRP) chip 24. DRP chip 24 is a commercially available, digital processor-controlled, record/playback device. The digital processor within DRP chip 24 converts analog input signals to digital data during the record function and re-converts the digital data back to analog signals during the playback function.

A dynamic random access memory 26 (DRAM) is connected to DRP chip 24 and provides data storage therefor. Also connected to DRP chip 24 is an output amplifier 28 which is, in turn, connected to a speaker 30. A microphone 32 is used to input distinctive ring annunciation signals to DRP chip 24. Switches S1, S2, and S3, respectively, provide pause/stop control signals, record/play control and reset control. A crystal Y1 provides the necessary clock frequency for the operation of DRP chip 24.

Prior to connection of ring annunciator 14 to a telephone line, the user is enabled, through the use of switches S1–S3 and microphone 32, to record either a special ring tone, cadence or message to be annunciated when a ring voltage is received. Such a distinctive tone, cadence or message will differentiate the call to connected telephone 12 from calls other closely spaced telephones. DRP chip 24 responds to an input from microphone 32 by digitizing the input signal and causing the digital values indicative thereof to be stored in DRAM 26. Thereafter, upon receipt of a control signal on start/stop line 22, DRP chip 24 recalls the data stored in DRAM 26, causes its conversion to an analog output and, in turn, applies the analog signal, via resistor R7 and amplifier 28 to speaker 30.

When a user lifts the hand set of telephone 12, such action is sensed by the telephone central office which then terminates the ring voltage. As a result, the control signals which have been output by pulse stretcher 20 also cease, causing DRP chip 24 to stop feeding output amplifier 28 the annunciation signal.

DRP chip 24 is preferably a TC8831F voice recording/ reproducing LSI system produced by the Toshiba Corporation, Tokyo, Japan. However, any other digital recording/playback chip which provides both recording and playback capability is equally acceptable. Pulse stretcher 20 is preferably configured from a 555 timer module which is available from the National Semiconductor Corporation. The 555 is a monolithic timing circuit which responds to a trigger input exceeding a determined threshold level by providing a control voltage output of a determined time period. Output amplifier 28 is preferably an LM386 low voltage audio power amplifier available from the National Semiconductor Corporation.

The remaining circuitry connecting the various modules which comprise the invention and their functions are well known to those skilled in the art and will not be furthered described.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. An annunciator that is adapted to be connected to a phone line to which a telephone is also connected, said annunciator adapted to respond without any caller communication other than a ring signal and comprising:

connector means for connecting to a ring signal conductor in a telephone line;

sense means, coupled to said connector means for converting a caller-initiated ring signal to a control signal;

speaker means;

memory for storing data indicative of a distinctive annunciation pattern; and processor-controlled means responsive to said control signal from said sense means for accessing said data from said memory without further caller intervention, and for driving said speaker means to audibly output said distinctive annunciation pattern.

2. The annunciator as recited in claim 1, further comprising:

input means coupled to said processor-controlled means for enabling a user to input said distinctive annunciation pattern, said processor means responding to such an input to store data in said memory indicative of said distinctive annunciation pattern.

3. The annunciator as recited in claim 1, wherein said connector means couples said annunciator to said conductor in parallel with said telephone.

4. The annunciator as recited in claim 1, wherein said sense means comprises:

a pulse stretcher for responding to a ring signal to output a control signal that is suitable for application and control of said processor-controlled means.

5. The annunciator as recited in claim 1 wherein said processor-controlled means is a digital recording/playback reproduction device which enables both recording of an annunciation signal and storage of digital data indicative thereof in said memory and, further, enables accessing of said digital data from said memory and playback thereof to said speaker means.

* * * * *